US008428811B2

(12) United States Patent
Cahill et al.

(10) Patent No.: US 8,428,811 B2
(45) Date of Patent: Apr. 23, 2013

(54) VEHICLE DIAGNOSTIC EQUIPMENT PROVIDING HANDS FREE OPERATION

(75) Inventors: Edward P. Cahill, Killaloe (IE); Kieran J. Maher, Cork (IE)

(73) Assignee: Snap-on Incorporated, Kenosha, WI (US)

( * ) Notice: Subject to any disclaimer, the term of this patent is extended or adjusted under 35 U.S.C. 154(b) by 738 days.

(21) Appl. No.: 12/377,662

(22) PCT Filed: Aug. 17, 2006

(86) PCT No.: PCT/EP2006/065414
§ 371 (c)(1), (2), (4) Date: Nov. 2, 2009

(87) PCT Pub. No.: WO2008/019709
PCT Pub. Date: Feb. 21, 2008

(65) Prior Publication Data
US 2010/0076644 A1 Mar. 25, 2010

(51) Int. Cl.
*G01M 17/00* (2006.01)

(52) U.S. Cl.
USPC ......... 701/31.4; 701/29.1; 701/29.8; 340/438

(58) Field of Classification Search ................. 701/31.4, 701/31.5, 31.6, 29.1, 29.8, 34.4; 340/438, 340/439
See application file for complete search history.

(56) References Cited

U.S. PATENT DOCUMENTS

| | | | | |
|---|---|---|---|---|
| 4,827,520 | A | 5/1989 | Zeinstra | |
| 5,214,707 | A | 5/1993 | Fujimoto et al. | |
| 6,175,782 | B1 | 1/2001 | Obradovich et al. | |
| 6,330,499 | B1 | 12/2001 | Chou et al. | |
| 6,556,971 | B1 * | 4/2003 | Rigsby et al. | 704/270 |
| 2002/0049535 | A1 | 4/2002 | Rigo et al. | |
| 2003/0088347 | A1 | 5/2003 | Ames | |
| 2007/0093947 | A1 * | 4/2007 | Gould et al. | 701/29 |

FOREIGN PATENT DOCUMENTS

| | | |
|---|---|---|
| JP | 2002 257692 | 9/2002 |
| WO | 98/54021 A1 | 12/1998 |
| WO | 2004/044546 | 5/2004 |
| WO | 2004/064343 | 7/2004 |
| WO | 2005/064438 | 7/2005 |

OTHER PUBLICATIONS

European Patent Office, International Search Report, International Application No. PCT/EP2006/065414, Form PCT/ISA/210, date of mailing of the international search report May 23, 2007, 3 pages.

International Searching Authority, European Patent Office, PCT Written Opinion of the International Searching Authority (PCT Rule 43bis.1), International Application No. PCT/EP2006/065414, Feb. 17, 2009, 6 pages.

European Patent Office, Examination report for application No. 06 778 268.0, Sep. 14, 2010, 3 pages.

European Patent Office, Examination report for application No. 06 778 268.0, Nov. 21, 2012, 6 pages.

* cited by examiner

*Primary Examiner* — Gertrude Arthur Jeanglaude
(74) *Attorney, Agent, or Firm* — McDonnell Boehnen Hulbert & Berghoff LLP

(57) ABSTRACT

A voice activated vehicle diagnostic system provides for hands free operation of the system. Using such a system it is possible for the diagnostic system to be used safely in a test drive of the vehicle with the operator of the system not required to physically touch the system to implement one or more tests as required.

25 Claims, 6 Drawing Sheets

VEHICLE DIAGNOSTIC EQUIPMENT PROVIDING HANDS FREE OPERATION

This application is a National Stage application of International Application No. PCT/EP2006/065414, filed Aug. 17, 2006.

BACKGROUND

1. Field

This invention relates to vehicle diagnostic equipment, including scan tools that analyze data streams, such as data streams that comply with the OBD II or EOBD data stream specifications. The invention more particularly relates to a vehicle diagnostic tool that is voice activated. Such a tool may be operated during a test drive of the vehicle being tested in a hands free configuration.

2. Description of Related Art

Vehicles, such as automobiles, often include numerous on-board computer systems. Each computer system often operates and tests various aspects of the vehicle, including aspects relating to the engine, anti-lock braking system (ABS), transmission and air bag. The number of on-board computer systems will vary from vehicle to vehicle but it is not intended within the context of the present invention to limit to any one number or numbers of such computers.

Scan tools are diagnostic devices that provide information about vehicles through interrogation of these on-board computer systems. An interrogation may seek one or more individual sensor data readings, such as a throttle, RPM or coolant temperature. Another interrogation may test for the setting of codes by the vehicle, such as a code indicating that there was an emission fault. A still further interrogation may cause the vehicle to perform a particular test and to return the results of that test.

Scan tools often communicate with the vehicle in accordance with an established communication specification, such as the OBD II or EOBD data stream specification, as will be appreciated by the person skilled in the art. Within the context of the present invention it will be appreciated that the two heretofore mentioned standards are exemplary of the type of vehicle ECU communication protocols that may be used to interrogate a vehicle electronic control unit. The diagnostic information that is returned from the vehicle may be displayed either in text or graphic format on a display associated with the scantool.

In order to diagnose a particular problem with the vehicle, the mechanic or technician must often determine which tests to administer and must analyze the diagnostic information that is returned as a result. Some scan tools assist the mechanic by allowing the mechanic to program the scan tool to begin recording diagnostic information when a particular condition is met, such as when the output of a sensor exceeds a pre-determined value. However, connecting a scan tool to a stationary vehicle in a workshop does not always give the mechanic a full diagnostic picture of the vehicle as some problems are only identifiable during normal driving conditions. It is therefore sometimes necessary for the mechanic to undertake a test drive of the vehicle. A diagnostic test drive is particular relevant when the technician is faced with an intermittent vehicle diagnostic problem or determining if a known issue has been fixed as most ECU's (Electronic Control Unit) will only store a fault code when a system or sensor fails. Intermittent faults will not be stored in memory and the only way to fully access a fault is to monitor the diagnostic PID (Parameter Identification Number) data while the vehicle is in motion and components and sensors are under load. Therefore as part of an optimum diagnostic process, technicians need to utilize a vehicle test-drive to determine and correct faults.

While recognizing that a vehicle test drive is a part of the diagnostic process, the problem is that heretofore no scan tool devices have been designed specifically to function safely during a vehicle test-drive with a single technician.

The dealerships are recommended by the vehicle OEMs (Original Equipment Manufacturer) to have two technicians in a vehicle for diagnostic test drives, this would allow one to concentrate on the scan tool data readings and while the other focuses on driving the vehicle. However, the reality is, and acknowledged by the manufacturers, that even in dealerships it would be prohibitively expensive for workshops to have two technicians doing a diagnostic test drive.

Furthermore, driving legislation is continuously evolving, where in-car distractions to drivers such as hand held mobile phones are no longer tolerated for safety reasons. Given the heavy traffic loads on roads no matter how skilled a technician any momentary distraction while analyzing a scan tool could easily result in an accident.

There is therefore a need for a scan tool that may be operated in test drive conditions by a single technician.

SUMMARY

These and other problems are addressed by a vehicle diagnostic system in accordance with the teachings of the present invention. Such a vehicle diagnostic system is configured to be operable in a hands free configuration and may provide audible feedback to the operator and/or may be operable in response to voice control. In this way the technician may interact with the equipment while maintaining full control of the vehicle.

The vehicle diagnostic system may include a vehicle interface configured to receive the diagnostic information from the vehicle in the form of a data stream and to deliver the diagnostic information to the processing system. The vehicle interface may be configured to receive a data stream in compliance with the OBD II or EOBD data stream specifications or other protocols which are used to interface with a vehicle ECU.

These as well as other objects, features, benefits, components and steps will now become clear from the following detailed description of illustrative embodiments and the accompanying drawings.

DETAILED DESCRIPTION OF ILLUSTRATIVE EMBODIMENTS

Figure 1:
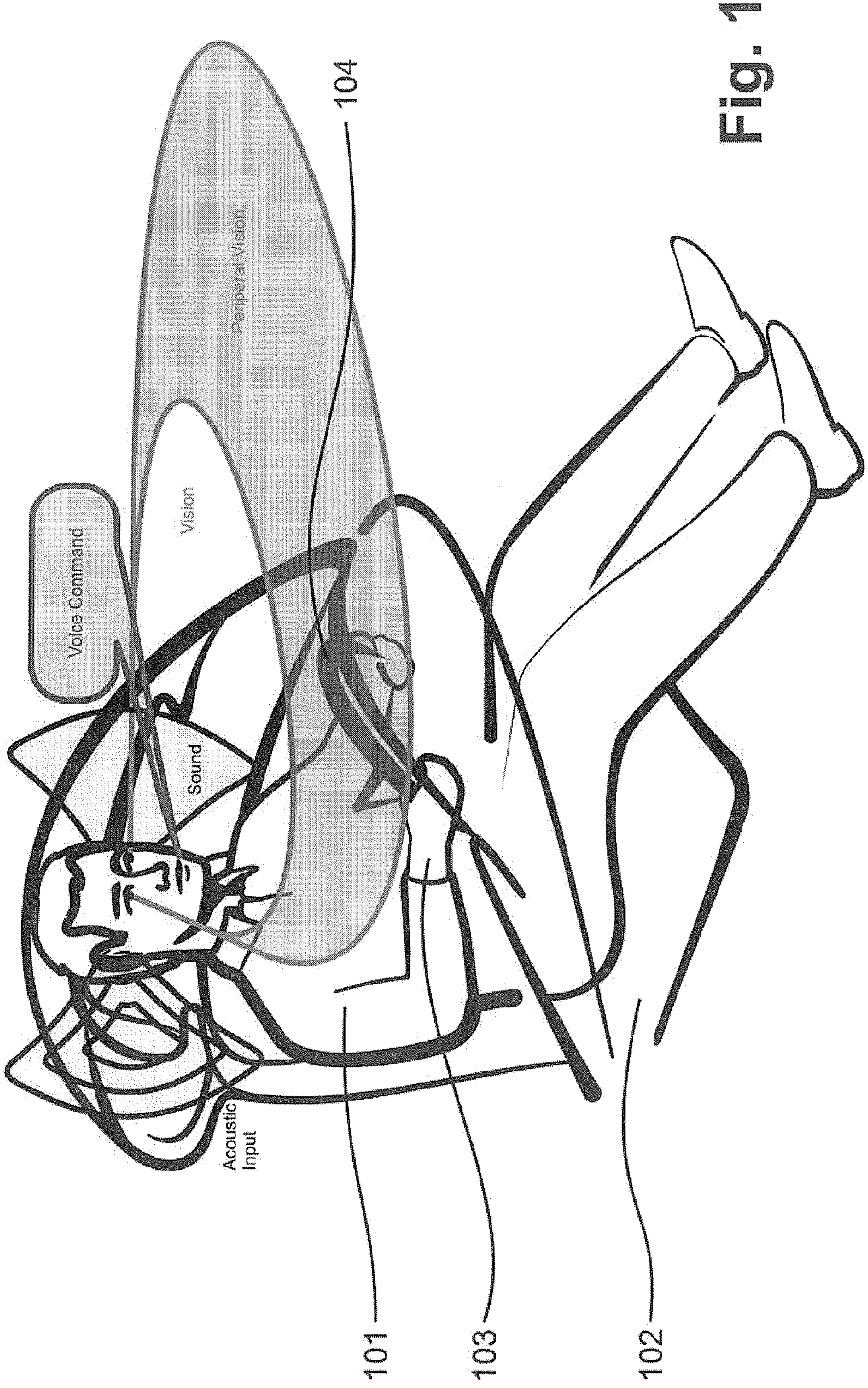
FIG. 1 is a schematic showing a typical scenario during operation of a vehicle diagnostic system in accordance with the teaching of the invention.

FIG. 1 is a schematic showing a typical driving scenario during operation of a vehicle diagnostic system in accordance with the teaching of the invention As shown in FIG. 1, a driver 101, typically the technician or mechanic undertaking the test, is seated in the driver's seat 102 of the vehicle and is concentrating on driving the vehicle. While seated, the hands 103 of the driver are on is the steering wheel 104, and his eyes are looking forward to observe the road and traffic conditions. Although he is concentrating on the road, the driver is capable of uttering voice commands through his mouth or listening to sounds within the vehicle through his ears.

Figure 2:
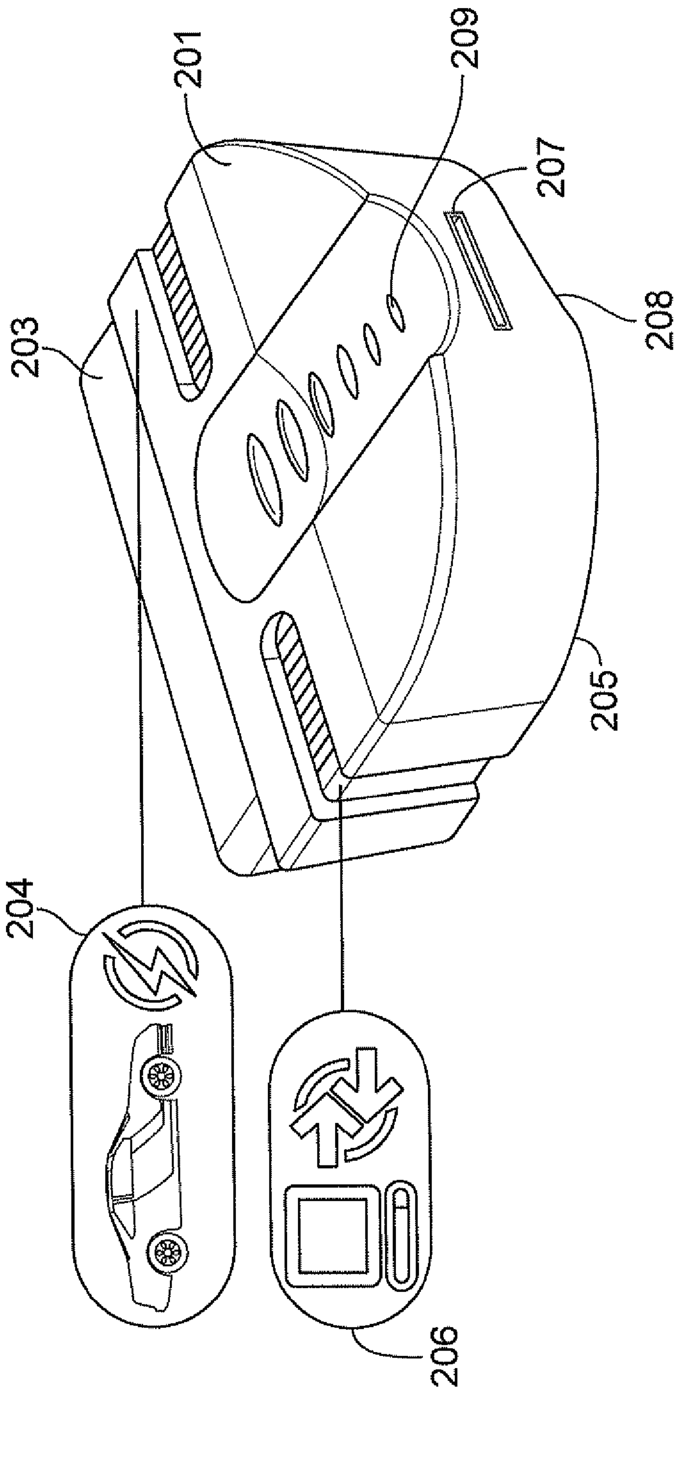
FIG. 2 shows an example of a system in accordance with the teaching of the invention.
Figure 3:
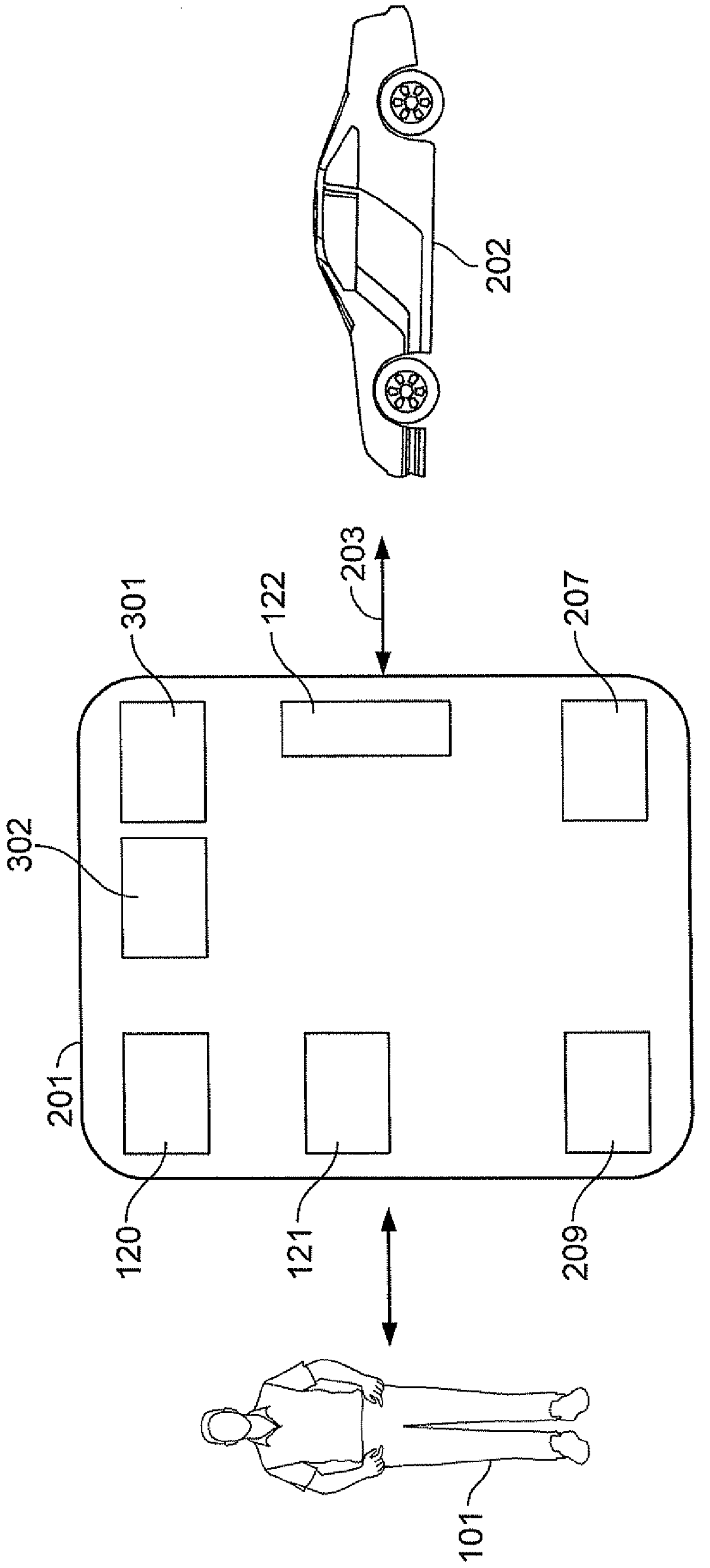
FIG. 3 shows in block form an architecture in accordance with the teaching of the invention

An example of a vehicle diagnostic system 201 in accordance with the teaching of the invention is shown in FIGS. 2 & 3. Such a system is configured to take advantage of the capabilities of the driver 101 of FIG. 1, specifically his capability to talk while driving and is controllable by the voice commands of the driver. The system 201 includes a voice activation control module 120 that is responsive to voice commands uttered by the driver 101.

The diagnostic system 201 is further configured to be in communication with a vehicle 202 using a communication link 203 that may be for example a simple plug in connector connectable to an available OBD port which is available in the cabin of the vehicle. Such communication involves the transfer of data requests from the system 201 and the receipt of a data stream from the vehicle in response. The communication link 203 is controlled by a vehicle interface module 122, which in turn is controlled by an a processing module 121 which interfaces with one or more stored rules-stored in a rules module 301, so as to determine which type of data is required from the vehicle. The rules storage system 301 may be configured to store one or more rules. Each rule or combination of rules may determine whether a vehicle may have an anomaly when the rule is applied to diagnostic information from the vehicle. The processing system 121 may be any type of processing system and may include hardware and/or software components. It may include one or more microprocessors, storage devices and/or memories.

The processing system 121 may coordinate and manage the operations of the vehicle diagnostic system 201 and the communication between its various components.

An LED 204 or some other sort of visual indicator may be provided on the casing 205 of the system 201 to indicate when the communication link is established.

Other indicators that may be provided include LED's 206 that show when communication is effected with a computer using an electronic communication module 207 that may for example be implemented using a standard computer interface such as a parallel or serial communication port. The latter communication model is typically utilized subsequent to the test drive when a more detailed analysis of the data recorded is implemented, and it is necessary to retrieve information that is stored within the system 201.

During operation, the system records information from the vehicle in a data store 302, and when returning to the workshop the technician can remove the system from the vehicle and interface it with a scan tool to allow detailed analysis be conducted. Typical types of information include speed and odometer information which may be used to provide the customer with detailed information and feedback as to the test drive conditions. Other examples or implementations could include a version of the system that is installed in the vehicle and operated by the customer during multiple trips to collect more information than is typically possible. As the system is operable under voice commands, it is not necessary for the driver of the vehicle to be a skilled mechanic, they simply need to instruct the system when to initiate and when to terminate collection of data.

The data store 302 is configured to store the received data from the vehicle. Such data may be provided in the form of a movie of the incoming data stream or a series of snap-shots. Within the context of the invention, the term "movie" is intended to define a set of data parameters separated only in the time domain. For example at the present moment in time it is known for the data stream to provide a snap shot of the vehicle at a certain instant in time, with that snap shot including information on the status of for example trouble codes and other data parameters. The data store of the present invention may be configured to store a time sequence of a plurality of these snap shots so as to define a movie having historical data relating to the status of individual codes over an extended time period. The movie can then be interrogated at a later stage to ascertain trends or values relative to previous values. The movie that is generated of the output from the vehicle typically is typically defined by a sequence of snap-shots before and after some applied trigger point. The triggering may be automatically implemented by a rule or may be externally activated by a user of the system. A movie therefore may be considered as a set comprising a plurality of frames, each frame being defined by collection data readings and/or trouble codes. It will be understood therefore that a movie of a first set of readings may have different frame characteristics to that of a movie of another set of readings-where the first and second set of readings are used in the diagnosis of different problems associated with the vehicle. Further information on the use of movies within the context of vehicle diagnostic systems may be found in WO2005EP054918, co assigned to the assignee of the present invention, the content of which is incorporated herein by way of reference. Using the voice activation of the present invention, the operator of the vehicle may decide at a certain instance to store certain periods of data by uttering a voice command which is picked up and acted on by the system 201.

The casing 205 is desirably provided with a small footprint so that it could be installed in the foot well of a car, without taking up too much room and preventing the driver getting complete access to the pedals. Typically this is achieved by having the casing 205 dimensioned to follow the minimum profile of the OBD connector, if this type of connector is used. It is optimal that the casing be provided in a high visible color, for reasons that arise out of the intended location of use of such systems. It will be understood that conventionally the port providing access to the vehicle ECU is provided in a footwell which is a dark region within the vehicle. By using bright, preferably luminescent colors it is less likely that the mechanic will leave the system in the vehicle after use. The outer surface may be contoured to provide a hand or finger grip 208 to assist in carrying the system.

A user interface 209 in the form of a speaker is desirably provided which to may be configured to emit a sound if a specific error condition is detected during operation of the vehicle or indeed to simply list off a plurality of error conditions as they are sensed during the test drive. It will be appreciated by those skilled in the art that there are a plurality of different possible faults that could be identified and therefore in a desirable embodiment while these codes could be listed to the operator, it is preferable that the system be configured to convert these codes into meaningful data. Ideally, the device could tell the operator the failure represented by the code and a brief analysis of the failure. To do this the data will have to be interrupted by a scan tool with the scan tool text converted into voice synthesis so that the fault can be communicated back to the mechanic. Also, it is possible that a number of codes could be triggered at one time, requiring the data to be sorted and then logically presented to the operator.

In its basic form however, the device could be configured to emit an audible beep when a code or error is detected so as to either auto-activate a trigger to record the parameters or component that failed or to prompt the driver of the vehicle to activate the record facility.

The handsfree/operator communication element is necessary to control the data being recorded as the vehicle/engine during a test drive has to be at normal operating temperature (approx 5/10 minutes into the drive) before starting the test. The purpose of the test drive is to detect component failures under load so the mechanic has to set the vehicle to match specific driving conditions to recreate reported failures by vehicle owners or to test replaced parts. By having voice control the mechanic can start and finish the test at specific times.

The vehicle 202 may be any type of vehicle, including a land vehicle, such as an automobile, truck or motorcycle; a flying vehicle, such as an airplane; or a watercraft, such as a ship.

A diagnostic system in accordance with the teaching of the invention provides diagnostic information about the vehicle. This information may be provided in response to requests for the information. Different types of information may be returned in response to different types of requests. Requests may be sent relating to different areas or aspects of the vehicle. When the vehicle 202 is an automobile, for example, requests may be sent relating to the engine, the anti-lock braking system (ABS), the transmission, the air bag controller and/or other systems or modules. A request may seek information about an individual sensor, such as a throttle, RPM or coolant temperature. A request may seek information about one or more codes that the vehicle has set, such as an indication that there has been an emission fault. A request may cause a test to be initiated and diagnostic information about the test to be returned.

As mentioned above, the communication with the vehicle may take place using a data stream, such as a data stream that is in compliance with the OBD II data stream specification or for example data that is compliant with the EOBD data stream specification.

Although shown as a standard physical connector in the embodiment of FIG. 2, it will be understood that the communication link 203 may be a wired link, a wireless link, or a combination of the two. The communication link 203 may comply with the OBD II data stream specification. The communication link 203 may include one or more connectors for temporarily connecting to the diagnostic system in the vehicle 202, such as a connector in compliance with the OBD II data stream specification.

Figure 4:
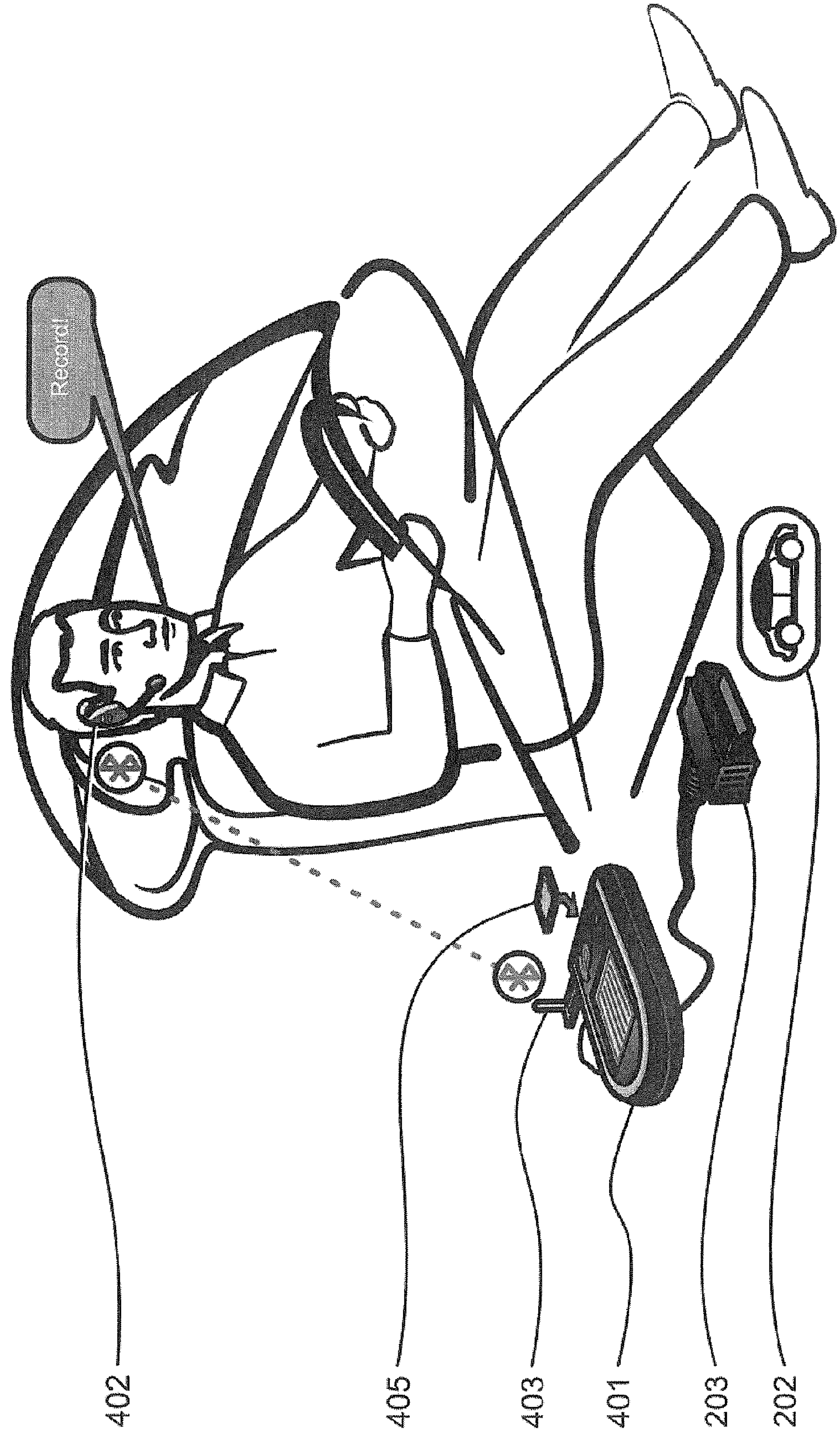
FIG. 4 is a schematic showing another typical scenario during operation of a vehicle diagnostic system in accordance with the teaching of the invention.

FIG. 4 is a schematic showing another embodiment of the invention where an existing diagnostic device 401 is modified to be activated on utterance of voice commands by the driver 101 of the vehicle. In such an embodiment, the driver 101 is provided with a headset 402 which is desirably configured to provide a wireless communication interface with the diagnostic system, the diagnostic system being provided with a wireless communications control system 403. The wireless communication control system 403 is analogous to the voice activation control 120 of FIGS. 1 to 3 but is typically retro fitted to the diagnostic system and interfaces with the integrally provided existing control systems found therein. Typical technologies that could be used for the interface between the driver and the system include those defined under the Bluetooth protocols, as will be apparent to those skilled in the art. The data store 302 of FIG. 3 is shown in this embodiment as a removable memory card 405 such as implemented using flash memory cards or the like.

Referring back to FIG. 3, it was discussed that the vehicle diagnostic system 201 may include an operator interface in the form of a speaker 209 that may be used to facilitate communications between the vehicle diagnostic system 201 and is the operator of the system. Although the speaker may be provided in the casing of the system, modifications may include the provision of a headset worn by the driver and through which he may listen to outputs from the system.

The operator interface 209 may be configured to alert the driver that the diagnostic system has detected a suspected anomaly in the vehicle under test. This may then prompt the driver to utter the voice command to store data that will have been cached in the memory so as to provide a history of the output of the car in a time period before and after the suspected anomaly for subsequent analysis.

The operator interface 209 may also be used in scenarios where instead of alerting the driver to a suspected anomaly may provide a description of the suspected anomaly and/or suggest one or more additional tests that may be run. Such prompting will evidently require a rules storage capability within the diagnostic system 201.

Figure 5:
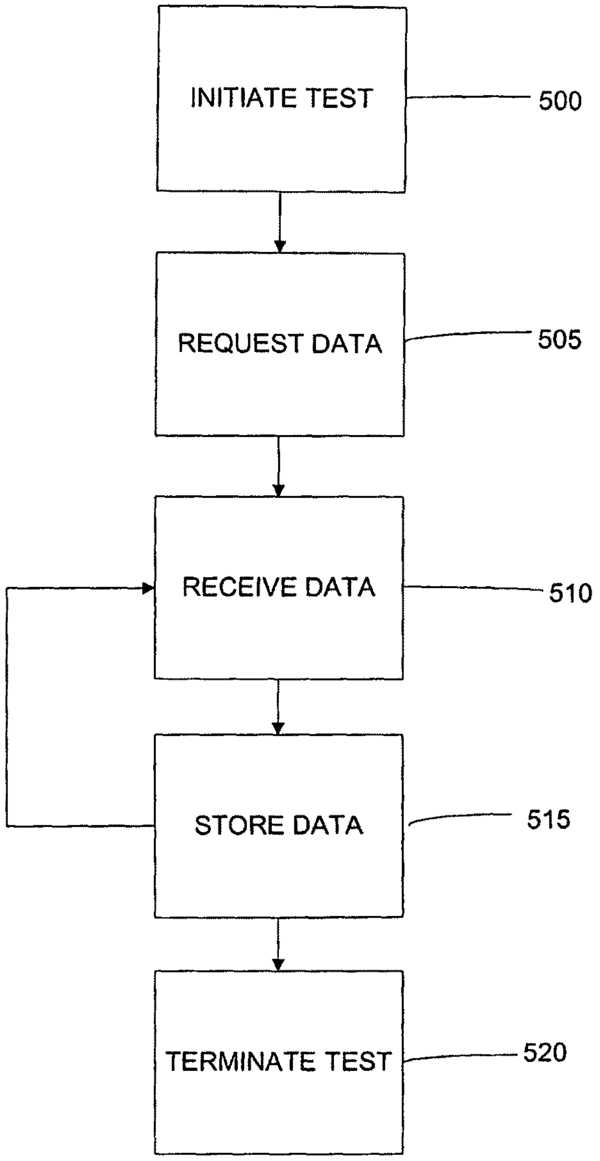
FIG. 5 is a flow diagram of one embodiment of a process that may be implemented by a vehicle diagnostic system of the present invention.

FIG. 5 is a flow diagram of one embodiment of a process that may be implemented by the vehicle diagnostic system 201 of the present invention. As shown in the sequential steps of FIG. 5, a simple test procedure requires the operator to utter a voice command "INITIATE TEST" (Step 500) which is detected by the voice activation control within the diagnostic system and which in turn causes a request for data from the vehicle (Step 505). The request for data in turn causes a receipt of a data stream from the vehicle (Step 510) which is stored in the data store (Step 515). This storage is continued until a command "TERMINATE TEST" (Step 520) is received. The stored data can be downloaded and analysed later.

Figure 6:
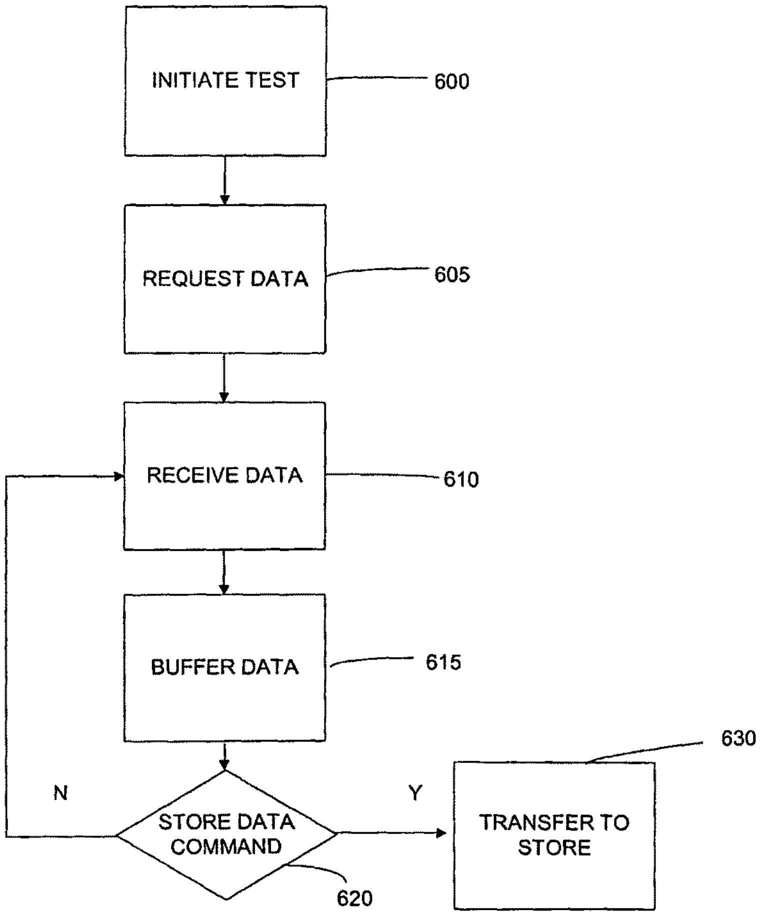
FIG. 6 is a flow diagram of another process that may be implemented in accordance with the teaching of the invention.

A modification of this test procedure is shown in FIG. 6, where again the system is put into test mode on receipt of an "INITIATE TEST" command (Step 600). This command runs the steps of requesting (Step 605) and receiving (Step 610) data to from the vehicle. In this embodiment however the received data is not stored permanently in the data store but is rather buffered (Step 615) for a specific time period in a FIFO (First in First Out) manner. The buffering will continue until a "STORE DATA" command is received (Step 620), on receipt of which the buffer is transferred to a permanent memory for subsequent analysis (Step 630). The process is will then continue. In this way the operator can determine when to store data, for example they may sense a fault in the performance and wish to analyse the data stream around that fault to ascertain what was the problem.

A further modification to this embodiment is where the processor, on applying one or more rules to the received data, will prompt the operator on detection of an anomaly in the received data stream to effect a storage of a portion of that data stream. In order to achieve concurrent problem identification/appropriate data storage, it will be appreciated that the processor will typically have to operate at a level of efficiency suitable to achieve concurrent identification with the refresh rate of the buffer.

It will be understood that as the system of the present invention is operable under voice commands that a certain degree of flexibility may be required with regard to what commands may be used for operation. In an operable scenario, a degree of learning may be required so as to enable the system to correctly interpret a command. Such problems will be apparent to those skilled in the art of voice recognition software and may require an initial "learning" process or set up. For example the user interface navigation may require a set before the mechanic leaves the garage. In a simple arrangement, commands would be kept to a minimum using concise words such as "Yes", "No", "Stop", "Start".

The foregoing description has been presented for the purpose of illustration only. It is not intended to be exhaustive or to limit the concepts that have been disclosed. Numerous modifications and variations are possible.

For example, the embodiments that have been described may include or be utilized with any appropriate voltage source, such as a battery, an alternator and the like, providing any appropriate voltage, such as about 12 volts, about 42 volts and the like.

The embodiments that have been described may be used with any desired system or engine. These systems or engines may use fossil fuels, such as gasoline, natural gas, propane and the like, electricity, such as that generated by a battery, magneto, solar cell and the like, wind and hybrids or combinations thereof. These is systems or engines may be incorporated into other systems, such as an automobile, a truck, a boat or ship, a motorcycle, a generator, an airplane and the like.

In short, the scope of this application is limited solely to the claims that now follow.

We claim:

1. A voice activated vehicle diagnostic system configured to be used in a vehicle during a test of the vehicle, the system comprising:

a vehicle interface configured to receive diagnostic information from the vehicle in the form of a data stream;

a vehicle data store configured to store at least a portion of the data stream so as to provide stored information for subsequent analysis;

an operator interface configured to receive voice commands from an operator of the vehicle diagnostic system so as to implement a predefined diagnostic operation within the vehicle diagnostic system;

a voice activation control module; and a processing system, the processing system being configured to deliver a plurality of different types of test requests to the vehicle, each test request causes a different type of diagnostic information to be sent by the vehicle to the vehicle diagnostic system, a choice of test request being determined in response to an appropriate voice command received by the voice activation control module.

2. The vehicle diagnostic system of claim 1, wherein , the voice activation control module is responsive to voice commands uttered by the operator and is configured to, on receipt of a voice command, effect a recordal of the diagnostic information.

3. The vehicle diagnostic system of claim 2, the control module being configured to effect a storage of the at least a portion of the data stream on receipt of a voice command.

4. The vehicle diagnostic system of claim 2, further including;

a headset, the headset being wearable by the operator, the headset being configured to effect communication with the voice activation control module.

5. The vehicle diagnostic system of claim 4, wherein communication between the headset and the voice activation control module is effected through a wireless communication protocol.

6. The vehicle diagnostic system of claim 5, wherein the wireless communication protocol is a Bluetooth communication protocol.

7. The vehicle diagnostic system of claim 5, wherein the voice activation control module is retro-fitted to the vehicle diagnostic system.

8. The vehicle diagnostic system of claim 1, wherein the processing system is configured to, on receipt of the diagnostic information from the vehicle, determine a presence of an anomaly in the vehicle.

9. The vehicle diagnostic system of claim 8, wherein the operator interface is further configured to provide an audible indicator that indicates the presence of the anomaly in the vehicle.

10. The vehicle diagnostic system of claim 9, wherein the processing system is further configured to provide through the operator interface, a suggestion indicating a further test request for subsequent delivery to the vehicle.

11. The vehicle diagnostic system of claim 1, wherein the processing system is configured to:

receive diagnostic information from the vehicle in response to each test request in a selected test set;

apply one or more rules to the diagnostic information provided in response to each test request in the selected test set; and cause the operator interface to alert the operator through an audible warning to each suspected anomaly in the vehicle that application of the one or more rules determine that the vehicle may have.

12. The vehicle diagnostic system of claim 1, further including:

a communications interface, wherein the communications interface is configured to enable an electronic interface with the system so as to effect a retrieval of the diagnostic information stored on the system.

13. The vehicle diagnostic system of claim 12, wherein the communications interface is arranged to download diagnostic information stored on the system to a separate computing device for analysis purposes.

14. The vehicle diagnostic system of claim 1, wherein the vehicle interface is configured to receive a data stream in compliance with an OBD II data stream specification.

15. The vehicle diagnostic system of claim 1, wherein the vehicle interface is configured to receive a data stream in compliance with an EOBD data stream specification.

16. The vehicle diagnostic system of claim 1, wherein the vehicle data store includes a buffer configured to temporarily store the at least a portion of the data stream received from the vehicle.

17. The vehicle diagnostic system of claim 16, wherein the buffer operates on a FIFO principle, such that frames of data making up the data stream are dropped from the buffer in a predetermined manner.

18. The vehicle diagnostic system of claim 16, wherein portions of the data stream present in the buffer define a sampled set of the data stream, this sampled set being selectable for storage as a movie.

19. The vehicle diagnostic system of claim 18, wherein the portions are selected on an external triggering provided by the operator in a form of a voice command, the triggering defining a trigger point within the buffered data stream about which the movie is defined.

20. The vehicle diagnostic system of claim 18, wherein the sampled set being selectable for storage as a movie is stored within a cache of the vehicle data store, the stored movie being associated with one or more identifiers specific to the movie.

21. The vehicle diagnostic system of claim 20, further including:

wherein the processing system is configured to apply one or more rules in a rules storage system to individual frames within the buffer in addition to application of one or more rules to the sampled set of the data stream.

22. A vehicle diagnostic process comprising:

sending, via a diagnostic system arranged for temporary connection to a communication link of a vehicle, a test request to the vehicle in response to a first voice command received at a voice activation control module of the diagnostic system;

receiving, at the diagnostic system, diagnostic information from the vehicle in response to the test request; buffering a portion of the received diagnostic information into a buffer in a first-in-first-out manner; and transferring, in response to a second voice command received at the voice activation control module, the portion of the received diagnostic information from the buffer to a permanent memory portion of a data store.

23. A computer program adapted to carry out the vehicle diagnostic process of claim 22 when run on a computer.

24. The vehicle diagnostic process of claim 22, further comprising:

applying, using a processor of the diagnostic system, one or more rules to the received diagnostic information to detect an anomaly in the received diagnostic information; and providing, via an operator interface of the diagnostic system, an alert that the diagnostic system has detected the anomaly in the received diagnostic information.

25. The vehicle diagnostic process of claim 22, further comprising:

removing the diagnostic system from the vehicle;

interfacing the diagnostic system with a scan tool; and analyzing, using the diagnostic system, the portion of the received diagnostic information transferred from the buffer to the permanent memory portion.

* * * * *